United States Patent
Meloche et al.

(10) Patent No.: US 8,165,030 B2
(45) Date of Patent: Apr. 24, 2012

(54) SYSTEM AND METHOD FOR MONITORING A NETWORK COMMUNICATION AT MULTIPLE NETWORK LAYERS

(75) Inventors: Jean Meloche, Madison, NJ (US); Richard Szajdecki, Jackson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 260 days.

(21) Appl. No.: 12/433,630

(22) Filed: Apr. 30, 2009

(65) Prior Publication Data
US 2010/0278056 A1 Nov. 4, 2010

(51) Int. Cl.
*G01R 31/08* (2006.01)
(52) U.S. Cl. .......................... 370/242; 370/389; 709/224
(58) Field of Classification Search .................. 370/352, 370/389, 390; 709/224
See application file for complete search history.

(56) References Cited

U.S. PATENT DOCUMENTS

| | | | |
|---|---|---|---|
| 6,243,454 B1 | 6/2001 | Eslambolchi | |
| 6,411,923 B1 | 6/2002 | Stewart et al. | |
| 6,542,504 B1 | 4/2003 | Mahler et al. | |
| 6,760,345 B1 | 7/2004 | Rosengard | |
| 6,775,240 B1 | 8/2004 | Zhang et al. | |
| 7,136,359 B1 | 11/2006 | Coile et al. | |
| 7,173,910 B2 | 2/2007 | Goodman | |
| 7,203,173 B2 | 4/2007 | Bonney et al. | |
| 7,340,529 B1 | 3/2008 | Yazaki et al. | |
| 7,899,048 B1 * | 3/2011 | Walker et al. | 370/390 |
| 2001/0050903 A1 | 12/2001 | Vanlint | |
| 2002/0012388 A1 | 1/2002 | Eldumiati et al. | |
| 2002/0021680 A1 | 2/2002 | Chen | |
| 2002/0057690 A1 | 5/2002 | Kingsley | |
| 2002/0191614 A1 | 12/2002 | Ido et al. | |
| 2002/0193999 A1 | 12/2002 | Keane et al. | |
| 2003/0028634 A1 * | 2/2003 | Oshizawa | 709/224 |
| 2003/0086425 A1 * | 5/2003 | Bearden et al. | 370/392 |

(Continued)

FOREIGN PATENT DOCUMENTS

EP 1763193 A1 3/2007

(Continued)

OTHER PUBLICATIONS

Webpage, Visual Performance Manager for Application Performance Management—Fluke Networks (http://www.flukenetworks.com/fnet/en-us/products/Visual+Performance+Manager/Overview...), Mar. 13, 2009, pp. 1-2.

(Continued)

*Primary Examiner* — Ayaz Sheikh
*Assistant Examiner* — Mounir Moutaouakil
(74) *Attorney, Agent, or Firm* — Sheridan Ross P.C.

(57) ABSTRACT

A network monitor gets a (layer 7) media path bill of materials for a communication between two communication devices. The network monitor also gets a (layer 7) signaling path bill of materials. The media path bill of materials and the signaling path bill of materials comprise a plurality of items that are involved in the communication (e.g. hardware, software, links). The media path bill of materials and the signaling path bill of materials comprise a communication path bill of materials. The network monitor sends at least one configuration packet to a plurality of network analyzers to monitor packets that contain a status of the communication in relation one or more items in the communication path bill of materials. The status of the communication is output and displayed in relation to the items in the communication path bill of materials.

31 Claims, 7 Drawing Sheets

U.S. PATENT DOCUMENTS

| | | |
|---|---|---|
| 2003/0165162 A1 | 9/2003 | Westphal |
| 2004/0052216 A1 | 3/2004 | Roh |
| 2004/0172464 A1 | 9/2004 | Nag |
| 2005/0041660 A1 | 2/2005 | Pennec et al. |
| 2006/0215596 A1 | 9/2006 | Krishnaswamy et al. |
| 2006/0218447 A1 | 9/2006 | Garcia et al. |
| 2006/0227714 A1 | 10/2006 | Griffin et al. |
| 2007/0081471 A1 | 4/2007 | Talley, Jr. et al. |
| 2007/0086336 A1 | 4/2007 | Richards et al. |
| 2007/0252695 A1 | 11/2007 | Bhavani |
| 2007/0286351 A1 | 12/2007 | Ethier et al. |
| 2008/0313312 A1 | 12/2008 | Flynn et al. |
| 2009/0073906 A1 | 3/2009 | Yi et al. |
| 2009/0268622 A1 | 10/2009 | Blum et al. |
| 2010/0027429 A1 | 2/2010 | Jorgens et al. |

FOREIGN PATENT DOCUMENTS

| | | |
|---|---|---|
| EP | 1228619 B1 | 2/2008 |
| WO | WO 2006/065863 A2 | 6/2006 |
| WO | WO 2007/036786 A2 | 4/2007 |

OTHER PUBLICATIONS

Network Instruments, "VoIP Analysis, Manager, Monitor, and Maintain VoIP Communications Across Enterprise Netowrks with Observer," 2006, Product Brochure, US, 4 pages.

Meloche, Jean, U.S. Appl. No. 12/533,483, entitled "System and Method for Comparing Packet Traces for Failed and Successful Communications," filed Jul. 31, 2009, 30 pages.

Meloche, Jean, U.S. Appl. No. 12/622,840, entitled "Detection and Display of Packet Changes in a Network," filed Nov. 20, 2009, 27 pages.

Denby, et al., U.S. Appl. No. 12/039,878, filed Feb. 29, 2008, for "Endpoint Device Configured to Permit User Reporting of Quality Problems in a Communication Network".

Flockhart, U.S. Appl. No. 12/239,120, filed Sep. 26, 2008, for "Clearing House for Publish/Subscribe of Status Data From Distributed Telecommunications Systems".

Meloche, U.S. Appl. No. 12/434,265, filed May 1, 2009, for "System and Method for Testing a Dynamic Communication Across a Network".

Meloche, U.S. Appl. No. 12/436,651, filed May 6, 2009, for "Intelligent Multi-Packet Header Compression".

Meloche, U.S. Appl. No. 12/410,980, filed Apr. 30, 2009, for "System and Method for Sendnig Packets Using Another Device's Network Address".

Search Report for UK Patent Application No. GB1004786.8, dated Jul. 21, 2010.

* cited by examiner

SYSTEM AND METHOD FOR MONITORING A NETWORK COMMUNICATION AT MULTIPLE NETWORK LAYERS

TECHNICAL FIELD

The system and method relates to network communication monitoring systems and in particular to systems that monitor network communications at multiple network layers.

BACKGROUND

Currently, there are a variety of systems that are designed to monitor network characteristics. Network monitoring systems tend to focus on network attributes at the networking layer and below (e.g. layers 1-3 of the Open Systems Interconnect (OSI) standard). In addition, the systems tend to focus on the hardware involved. These systems are limited in the fact that they do not provide a full picture of all the applications/hardware involved in a communication at various network levels, especially at layers above the network layer. For example, signaling packets for a communication may be sent over a different path than media data. Existing systems fail to show these types of distinctions. This causes problems in diagnosing errors that may occur when a communication is sent over a network.

As an example of a current system with the above problem, consider U.S. Patent Application Publication No. 2003/0086425, which discloses a system that can discover the arrangement of all physical devices in a network. The topology that is displayed is a map of the layer 2/layer 3 devices in the network. A path between two communication devices is also determined Based on the path, the quality of service between the two communication devices can be determined. The problem with this system is that only hardware devices are tracked at layers 2 and 3. The network paths of different types of traffic at layers above layer 3 are not tracked. Thus, this system cannot diagnose errors that may occur when different types of packets are sent between different applications at layers above layer 3.

Some systems track statistics at layers above layer 3. However, these systems tend to only focus on communications at a specific point in the network. For example, U.S. Patent Application Publication No. 2007/0086336, discloses a system that does track layer 7 statistics for a subscriber at edge routing nodes. Based on the statistics, certain policies can be applied to the data. The problem with this system is that it fails to determine all the devices/applications/paths involved in a communication at layer 7. Tracking the full communication path of different types of packets at different layers is not disclosed. Only a sampling of layer 7 statistics of a communication is taken at a specific point in the network. As a result, specific types of errors cannot be diagnosed because the full path of the communication at various layers is not tracked.

SUMMARY

The system and method are directed to solving these and other problems and disadvantages of the prior art. A network monitor gets a (layer 7) media path bill of materials for a communication between two communication devices. The network monitor gets a (layer 7) signaling path bill of materials. The signaling path bill of materials can be determined from the media path bill of materials. The media path bill of materials and the signaling path bill of materials comprise a plurality of items that are involved in the communication (e.g. hardware, software, links). The media path bill of materials and the signaling path bill of materials comprise a communication path bill of materials. The network monitor sends at least one configuration packet to a plurality of network analyzers to monitor packets that contain a status of the communication in relation one or more items in the communication path bill of materials. The status of the communication is output and displayed in relation to the items in the communication path bill of materials.

Other embodiments include querying the media path bill of materials for an associated signaling path item(s). The network address of the signaling path item(s) is then determined. The status of the communication can be displayed in the communication path bill of materials by mousing over individual items in the communication path bill of materials.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
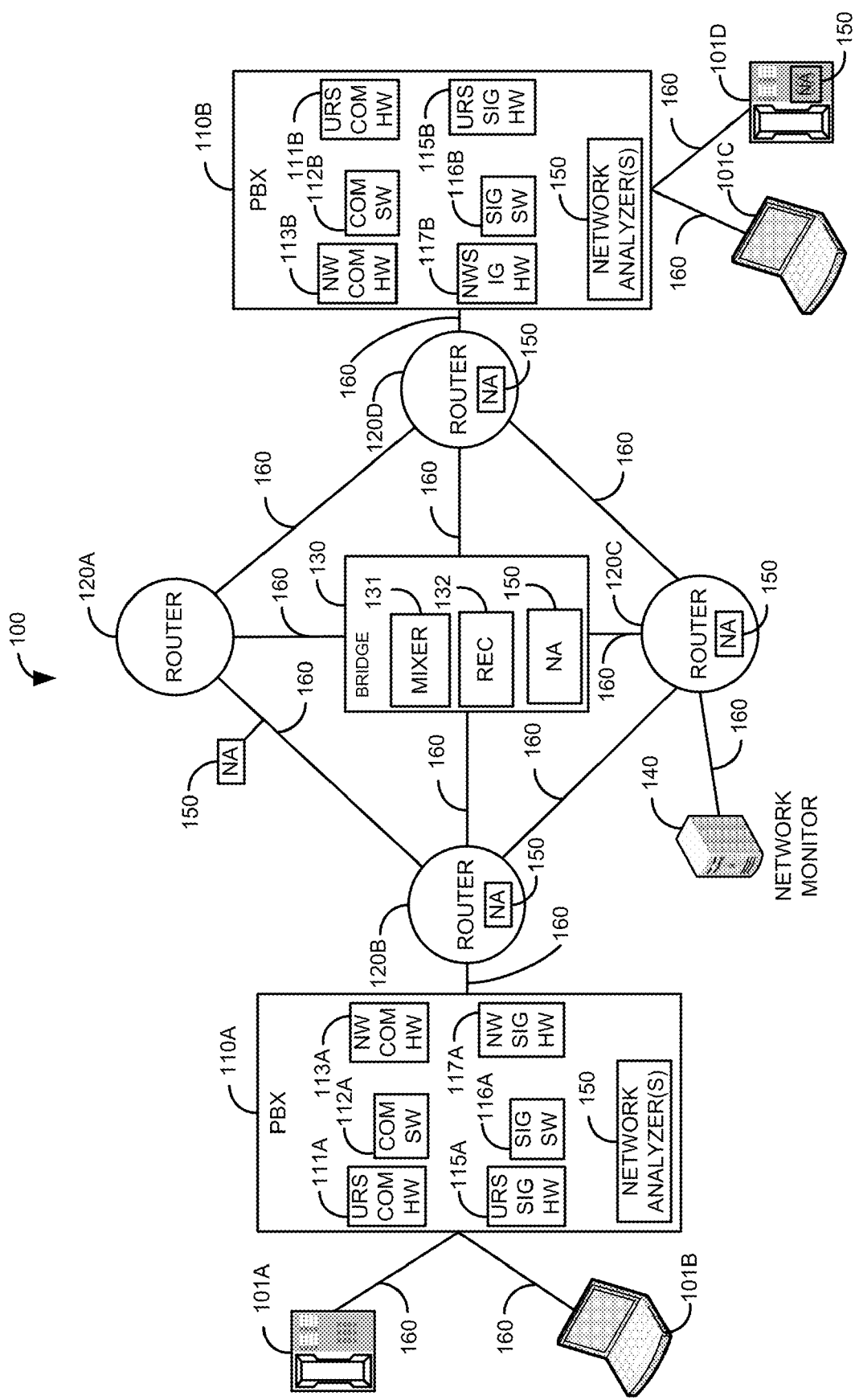
FIG. 1 is a block diagram of a first illustrative communication network.

FIG. 1 is a block diagram of a first illustrative communication network 100. FIG. 1 is an illustrative example of one of many possible configurations of a communication network. The illustrative communication network 100 may comprise various networks such as the Internet, a private network, the Public Switched Telephone Network (PSTN), and the like. The shown illustrative communication network 100 comprises communication devices 101, a Private Branch Exchange (PBX) 110, routers 120, a bridge 130, and a network monitor 140. The communication devices 101 can be any type of device that can communicate information such as a telephone, a cellular telephone, a Personal Digital Assistant (PDA), a Personal Computer (PC), a web server, a video camera, a camera, a video server, and the like. The PBX 110 can be any device capable of routing/switching a communication such as a router 120, a server, a switch, and the like.

The router 120 can be any device capable of routing communications in a network such as a PBX or a central office switch. The routers 120 can route packet communications and/or switch Time Division Multiplexed (TDM) communications. The bridge 130 can be any device capable of bridging communications such as a voice bridge, a video bridge, and the like. The network monitor 140 can be any device capable of monitoring network communications such as a server, a PBX 110, a PC, a communication device 101, and the like. The network monitor 140 can be distributed between multiple devices, including the communication devices 101. These devices 101 110, 120 130, 140 and 150 are connected via communication links 160. The communication links 160 can be any type of communication link such as a wireless link, a wired link, a packet switched link, a Time Division Multiplexed (TDM) link, a fiber optic link, and the like.

The PBX 110 further comprises user side communication hardware 111, communication software 112, network communication hardware 113, user side signaling hardware 115, signaling software 116, network signaling hardware 117, and a network analyzer(s) 150. The PBX 110 may have multiple network analyzers 150 to monitor each of the items 111-113 and 115-117 in the PBX 110. Some or all of the items 111-113 and 115-117 in the PBX 110 may have a unique network address. For example, the user side communication hardware 111 and the network communication hardware 113 may have separate Internet Protocol (IP) addresses while the communication software 112 may not have an associated IP address. The routers 120B-120D are shown with an embedded network analyzer 150. Router 120A is shown with an external network analyzer 150. Likewise, the communication devices 101 may have an embedded network analyzer 150 (101D) or not (101A-101C).

The network analyzers 150 are used to monitor one or more communications between one or more communication devices 101. The network analyzers 150 are configured using known techniques. For example, the system and method disclosed in U.S. patent application Ser. No. 12/410,980 which is incorporated herein by reference discloses a way that the network analyzers 150 can be configured to monitor the illustrative communication network 100. The network analyzers 150 could be passive network analyzers or the network analyzers 150 could be bridged network analyzers.

The bridge 130 further comprises a mixer 131, a recorder 132 and a network analyzer 150. The mixer 131 is used to mix audio and/or video streams. The recorder 132 is used to record an audio and/or video media stream.

The network monitor 140 gets a media path bill of materials. Media is non-signaling data associated with a communication at the application layer (layer 7). For example, in a Session Initiation Protocol (SIP) voice communication, the encoded voice stream packets would be considered media data. For a video communication, the encoded video signal would be considered media data. For a File Transfer Protocol (FTP), the file would be considered media data. Getting the bill of materials for a media path can be accomplished in a variety of ways. For example, US Patent Application Publication No. 2033/0086425 which is incorporated herein by reference discloses a way of determining a path of voice traffic between two communication devices 101.

The media path bill of materials comprises all the items (e.g. routers 120, PBX's 110, links 160, communication software 112, and the like) which media packet(s)/media data are processed by/sent across. For example, if media packets were sent (at layer 3) from communication device 101A via link 160 to user side communication hardware 111A via communication software 112A to network communication hardware 113A, the media path bill of materials (at layer 3) would include communication device 101A, link 160, user side communication hardware 111A, communication software 112A, and network communication hardware 113A.

The network monitor 140 also gets the signaling path bill of materials. An example way of getting the signaling path bill of materials is where the network monitor 140 determines from the media path bill of materials the signaling path bill of materials. The signaling path bill of materials (at layer 7) comprises all the items that signaling packets/signaling data are processed by/sent across. For example, if signaling packets were sent (at layer 7) from communication device 101A via link 160 to user side signaling hardware 115A via signaling software 116A to network signaling hardware 117A, the (layer 7) signaling path bill of materials would include communication device 101 A, link 160, user side signaling hardware 115A, signaling software 116A, and network signaling hardware 117A. Signaling packets/signaling data are packets/data that are used to establish the communication. For example, packets used to establish a SIP call such as a SIP Invite, SIP Ringing, SIP Acknowledgments, and the like would be considered signaling packets.

The media path bill of materials and the signaling path bill of comprise a communication path bill of materials. An item in the communication path bill of materials (media path bill of materials and the signaling path bill of materials) may be a hardware device, a virtual device (e.g. multiple threads of the same software process), a software element (e.g. communication software 112), a communication link 160, a packet switching device (e.g. router 120), a TDM device, and the like.

The network monitor 140 sends at least one configuration packet to the network analyzers 150 requesting them to monitor packet(s) that contain a status of the communication in relation to one of the items in the communication path bill of materials. The configuration packet can be a single broadcast packet to all of the network analyzers 150 or the network analyzer 150 can send a separate configuration packet(s) to specific network analyzers 150. The network analyzers 150 can monitor multiple communications. The status of the communication in the monitored packet can be determined in a variety of ways such as noise metric (e.g. how much noise is in a voice signal), an echo metric (e.g. echo in a voice communication), a suspicious port number (e.g. the port number was changed during the communication), a signal quality, a signal level, a timestamp, a number of lost packets, a number of delayed packets, an Internet Protocol (IP) address, a User Datagram Protocol (UDP) port, a UDP port, a Transmission Control Protocol (TCP) address, a TCP port, and a Media Access Control (MAC) address. The network analyzers 150 receive the configuration packet(s) from the network monitor 140.

The network analyzers 150 monitor for packets that are sent between the plurality of communication devices 101. The network analyzers 150 can monitor for packets sent between the plurality of communication devices 101 by looking at various fields in the packet/data such as a source and a destination IP address. The network monitor 140 and/or the network analyzers 150 can determine status of the communication in a variety of ways such as by examining a payload in the one or more packets to determine a packet type, determining if the payload in the one or more packets has a Real Time Transport (RTP) header, examining multiple fields in an Internet Protocol (IP)/User Datagram Protocol (UDP) header to determine the packet type, examining how often the one or more packets are being sent to determine the packet type, examining a UDP port number to determine the packet type, examining a Transmission Communication Protocol (TCP) port number to determine the packet type, and the like.

The network analyzer(s) 150 sends a response packet(s) that contains the status of the communication in relation to at least one of the items in the communication path bill of materials. The network monitor 140 receives the response packet(s) from the network analyzer(s) 150. The network monitor 140 outputs the status of the communication in relation to the monitored items in the communication path bill of materials. The network monitor 140 and/or the one of the communication devices 101 displays the outputted status of the communication in relation to the monitored item(s) in the communication path bill of materials (examples of the displayed status are shown in FIGS. 2-3).

Figure 2:
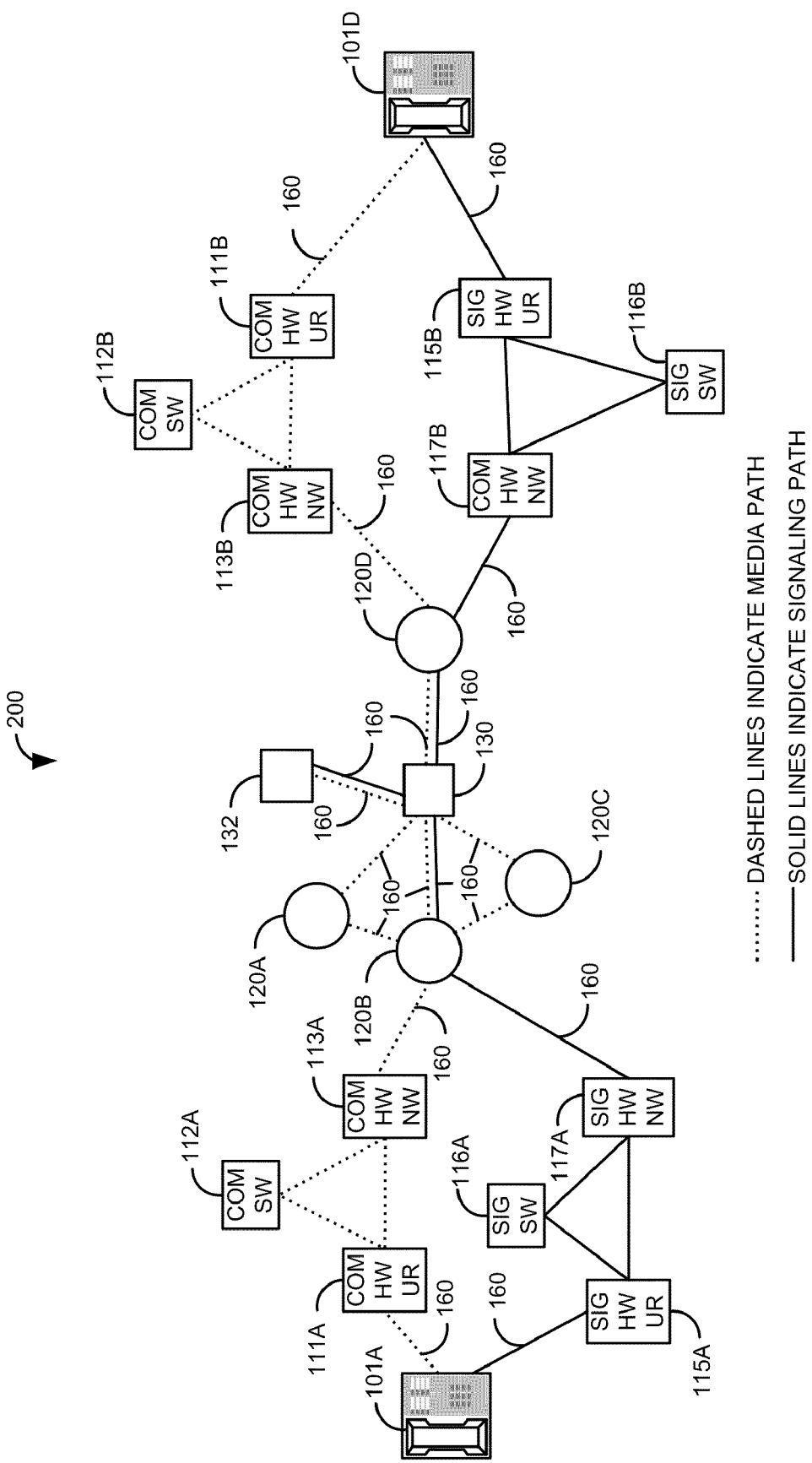
FIG. 2 is a first illustrative communication path bill of materials that displays a communication based on layer 3 items that process layer 7 packets.
Figure 3:
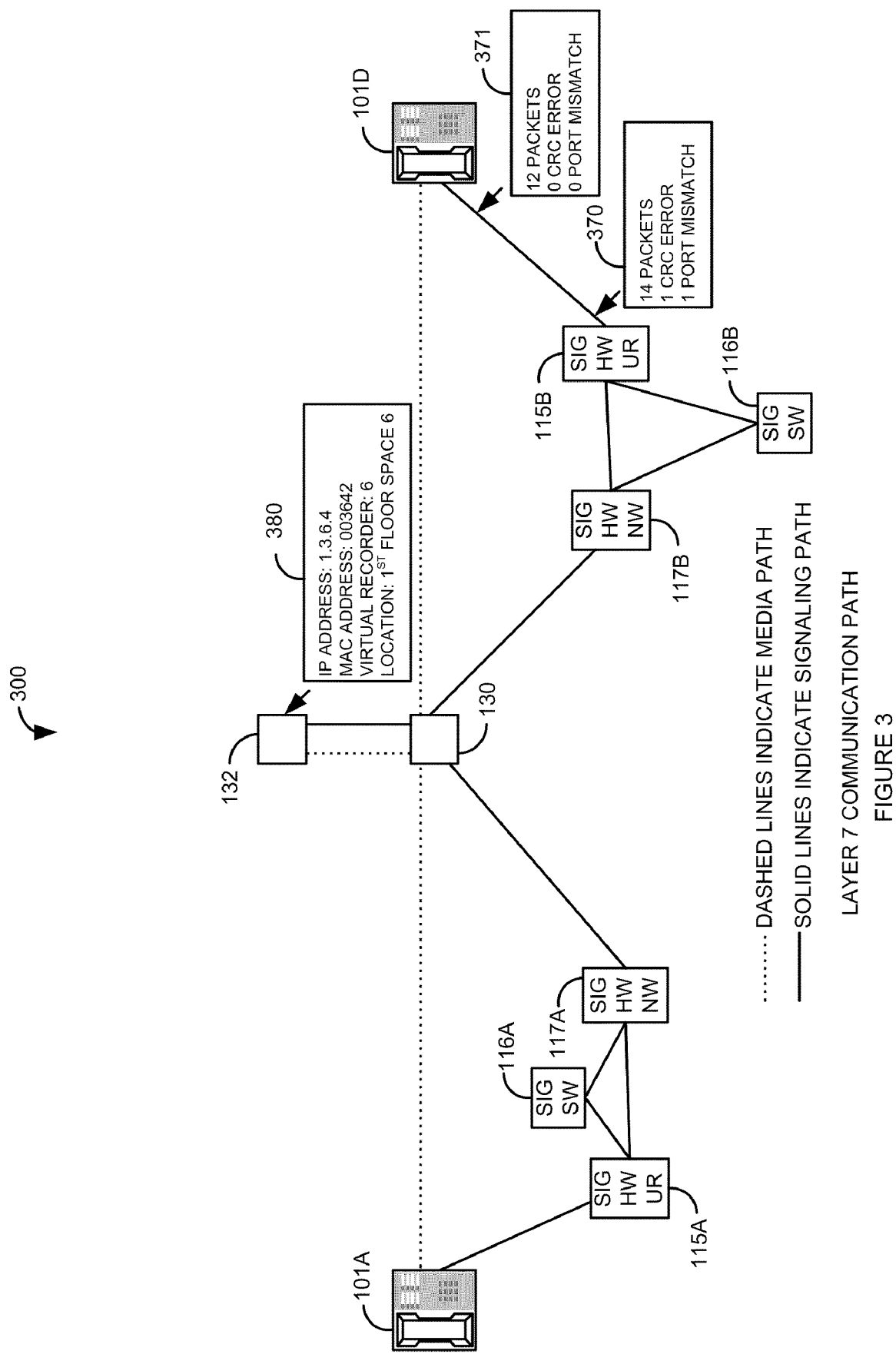
FIG. 3 is a second illustrative communication path bill of materials 300 that displays a communication at layer 7.

FIG. 2 is a first illustrative communication path bill of materials 200 that displays a communication based on layer 3 items that process layer 7 packets. Layer 7 signaling packets typically traverse different paths in a network than do media packets; thus the need to monitor the different paths that are taken by signaling and media packets.

FIG. 2 is an example of a communication between communication device 101A and communication device 101D, which is being recorded by recorder 132. In this illustrative example, all the items (communication devices 101, routers 120, and the like) displayed are devices that process packets at layer 3 and/or layer 7. For example, routers 120A-120D only process packets at layer 3 whereas items 101A 115A, 116A, 117A, 130, 132, 115B, 116B, 117B, and 101D process packets at layer 7 and potentially at layer 3. These items can also process packets at other layers such as layer 4 for TCP/UDP transport.

The network monitor 140 displays the layer 3/7 communication path bill of materials 200 after getting the media path bill of materials and getting the signaling path bill of materials. The items in the layer 3/7 media path bill of materials (101A, 111A, 112A, 113A, 120A-D, 130, 132, 113B, 112B, 111B, and 101D are shown connected by the dashed lines/ communication links 160. The items in the layer 3/7 signaling path bill of materials (101A, 115A, 116A, 117A, 120B, 130, 132, 120D, 117B, 116B, 115B, and 101D are shown connected by the solid lines/communication links 160.

FIG. 3 is a second illustrative communication path bill of materials 300 that displays a communication at layer 7. The second illustrative communication bill of materials is the layer 7 representation of the same communication shown in FIG. 2. In the second illustrative communication bill of materials 300, only those items in the communication path bill of materials involved in layer 7 are shown.

The network monitor 140 displays the layer 7 communication path bill of materials 300 after getting the media path bill of materials and getting the signaling path bill of materials. The items in the layer 7 media path bill of materials (101A, 130, 132, and 101D) are shown connected by the dashed lines. The items in the layer 7 signaling path bill of materials (101A, 115A, 116A, 117A, 130, 132, 117B, 116B, 115B, and 101D are shown by the solid lines. Note that the communication links 160 are no longer represented because the connections between the items no longer correspond to a specific communication link because the layer 7 connections may span multiple communication links 160. The communication path bills of materials shown in FIGS. 2 and 3 are representative of many combinations of communication path bills of materials that can be shown. For example, instead of a layer 3/7 communication path bill of materials, a layer 4/7 communication path bill of materials can be shown.

Status of the communication that is received from the network analyzers 150 can be displayed using a variety of mechanisms. For example, mousing (placing a mouse cursor) over the icon (e.g. an icon of node within a bill of materials) for the recorder 132 displays in a window 380 the IP address of the recorder 132, the Media Access Control (MAC) address, the virtual recorder (number 6) in the recorder 132, and the physical location (1st Floor Space 6). Other ways of displaying the status of the communication are done by mousing over a side next to an item 115B to display a window 370 that shows that 14 packets were received by the user side signaling hardware 115B, there was 1 packet with a Cyclic Redundancy Check (CRC) error, and 1 packet that had a port mismatch (the port number was changed from a known port number). By mousing over the other side next to communication device 101D, a window 371 is displayed showing that 12 packets were received by communication device 101D, there were 0 packets with CRC errors, and 0 packets with a port mismatch.

Other ways to show the status of the communication can include, but are not limited to setting a color of an individual item in the communication path bill of materials, displaying text on the item in the communication path bill of materials, changing an icon of an item in the communication path bill of materials, displaying the communication path bill of materials in conjunction with a physical map (the physical location of each item in the communication path bill of materials) of the items in the communication path bill of materials, and the like. Other possibilities include animations where links 160 between items (nodes) in the bill of materials are shown in different colors based on the network layer and/or function (e.g. signaling, media, Domain Naming Service (DNS), Internet Control Message Protocol (ICMP), and the like). The colors can also fade in intensity over time based on how long ago the packet(s) were sent. The physical map can be for example, a physical map of a building and where the items in a bill of materials are located.

The display of the first illustrative communication bill of materials 200 and the second illustrative communication bill of materials 300 can be initiated by a user at the network monitor 140. A user of the communication device 101 can also initiate the display of the first illustrative communication bill of materials 200 and the second illustrative communication bill of materials 300. This allows a user who is experiencing problems in a communication to initiate a test of the communication to detect any problems.

Figure 4:
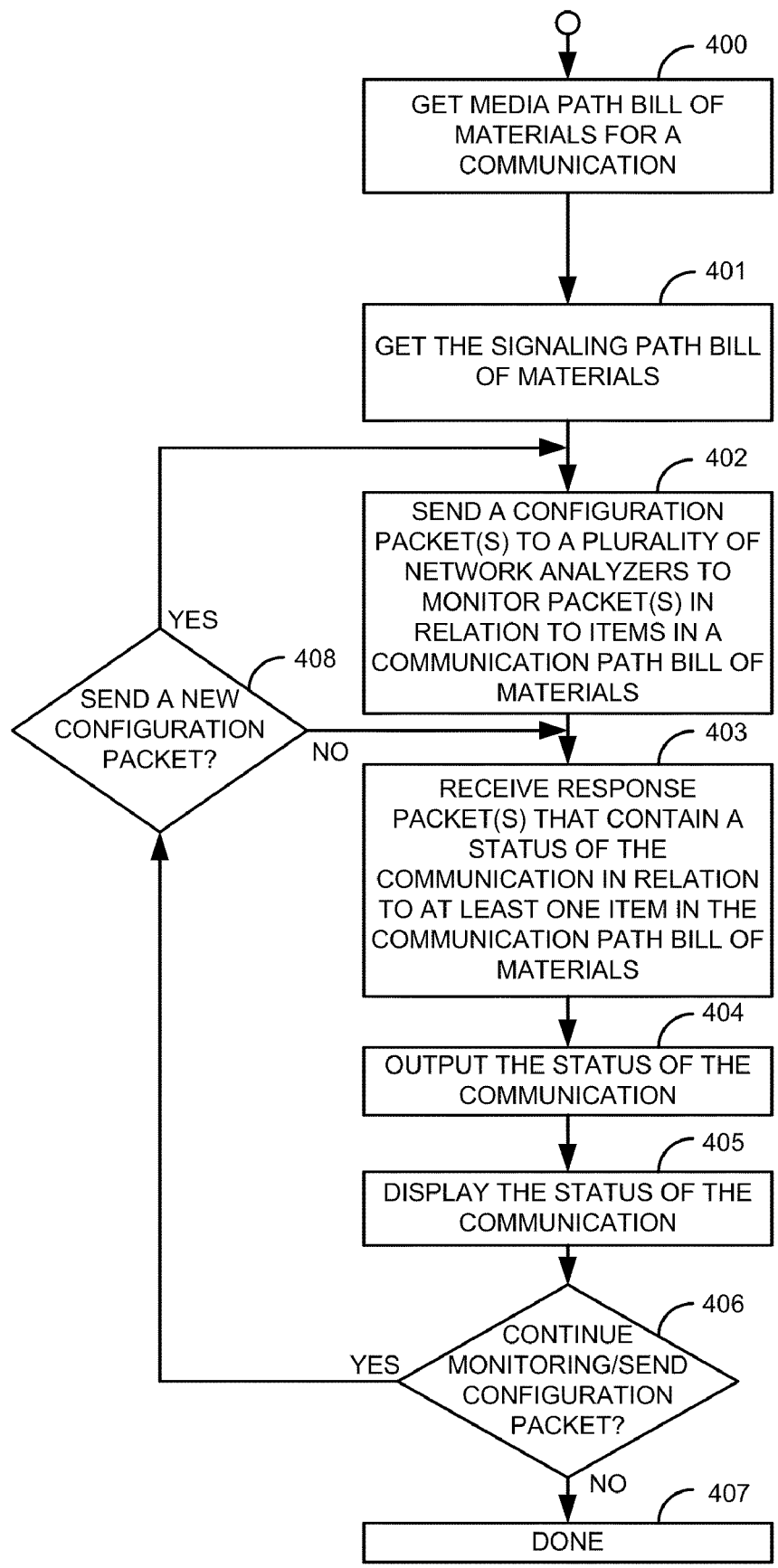
FIG. 4 is a flow diagram of a method for monitoring a signaling path and a media path of a network communication.

FIG. 4 is a flow diagram of a method of monitoring a signaling path and a media path of a network communication. Illustratively, the network analyzers 150 and the network monitor 140 are stored-program-controlled entities, such as a computer, which performs the method of FIGS. 4-7 by executing a program stored in a storage medium, such as a memory or disk.

The process starts with the network monitor 140 getting 400 a media path bill of materials for a communication between a plurality of communication devices 101. Getting the media path bill of materials can be done in various ways such as querying a managed communication, monitoring packets with a network analyzer(s) 150, and the like. The process also gets 401 a signaling path bill of material. This can be accomplished in a variety of ways. For example, the network monitor 140 can query items in the media path bill of materials for items in the signaling path bill of materials. The network monitor 140 then sends 402 a configuration packet(s) to a plurality of network analyzers 150 to monitor packets in relation to items in the communication path bill of materials (media bill of materials and signaling bill of materials). This can be accomplished in various ways such as instructing the network analyzers 150 to monitor a specific IP address, MAC address, query the status of a software application, examine packets for a specific UDP port number and IP address, and the like.

The network monitor 140 receives and/or waits to receive 403 a response packet(s) from the network analyzers 150 that contains a status of the communication for at least one of the items in the media path bill of materials and/or the signaling path bill of materials (communication bill of materials). The network monitor 140 outputs 404 the status of the communication. Outputting 404 the status of the communication can be done in various ways such as sending the results to an application (not shown) for processing, sending the status to a display (e.g. a video monitor) on the network monitor 140, sending the status to a display on a communication device 101, and the like. An example of an application that processes the output in step 404 would be an application that takes the status results and performs a diagnosis of the network to identify an item(s) in the communication path bill of materials that may need to be repaired. The network monitor 140 displays 405 the status of the communication by showing the communication path bill of materials.

If the network monitor 140 does not want to continue monitoring the status of the communication bill of materials and/or the network monitor 140 does not want to send any more configuration packets (e.g. monitor a new communication path bill of materials) in step 406, the process is done 407. Otherwise, if the network monitor 140 wants to continue monitoring the current communication path bill of materials and/or the network monitor 140 wants to send a new configuration packet(s), the process goes to step 408. If the network monitor wants to send a new configuration packet(s) in step 408, the network monitor sends 402 a configuration packet(s). Otherwise, the network monitor 140 receives and/or waits to receive 403 response packet(s).

Figure 5:
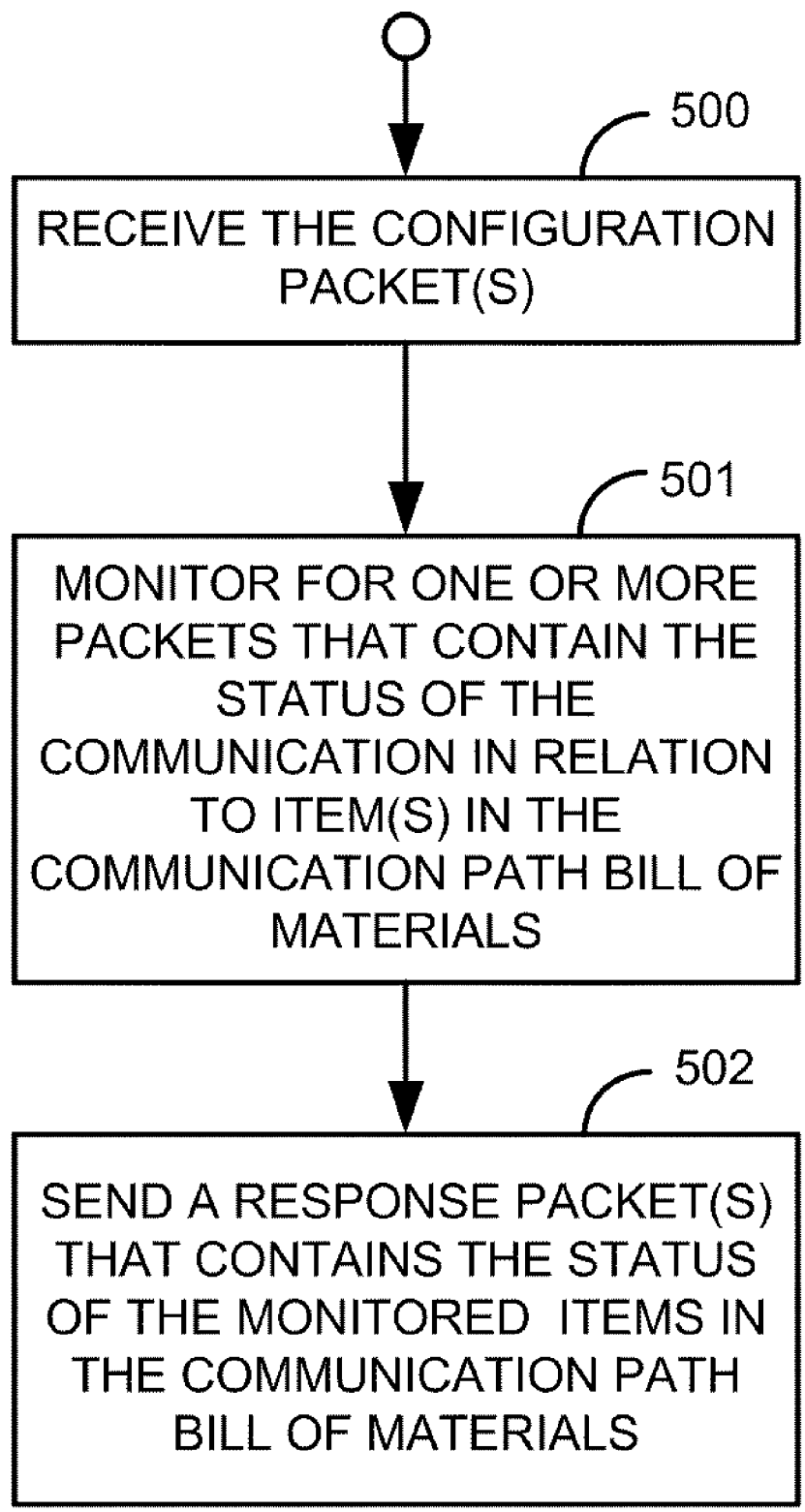
FIG. 5 is a flow diagram of a method for monitoring at a network analyzer packets that contain status of items in a communication path bill of materials.

FIG. 5 is a flow diagram of a method for monitoring at a network analyzer 150 packets that contain status of items in a communication path bill of materials. After the network monitor 140 sends 402 a configuration packet(s), the network analyzer 150 receives 500 the configuration packet(s). The configuration packet can contain instructions to monitor different kinds of statuses of one or more items in the communication path bill of materials. For example, the configuration packet could contain instructions to examine each packet from a specific IP address, determine if a packet has an RTP header, determine if a UDP port number in a packet is a specific UDP port number, capture the payload of a specific type of packet, and the like.

The network analyzer 150 monitors 501 for one or more packets that contain the status of the communication in relation to items in the communication path bill of materials based on the instructions in the configuration packet(s). Examples of monitoring the one or more packets can include, but are not limited to: counting the number of packets sent and received at a communication device 101, examining the payload of a packet for errors, examining a UDP/TCP port number in the packet, counting the time between packets from and/or to a specific IP address, and the like. The network analyzer 150 sends 502 a response packet(s) that contains the status of the monitored items in the communication path bill of materials. The response packets are then received by the network monitor 140 in step 403.

Figure 6:
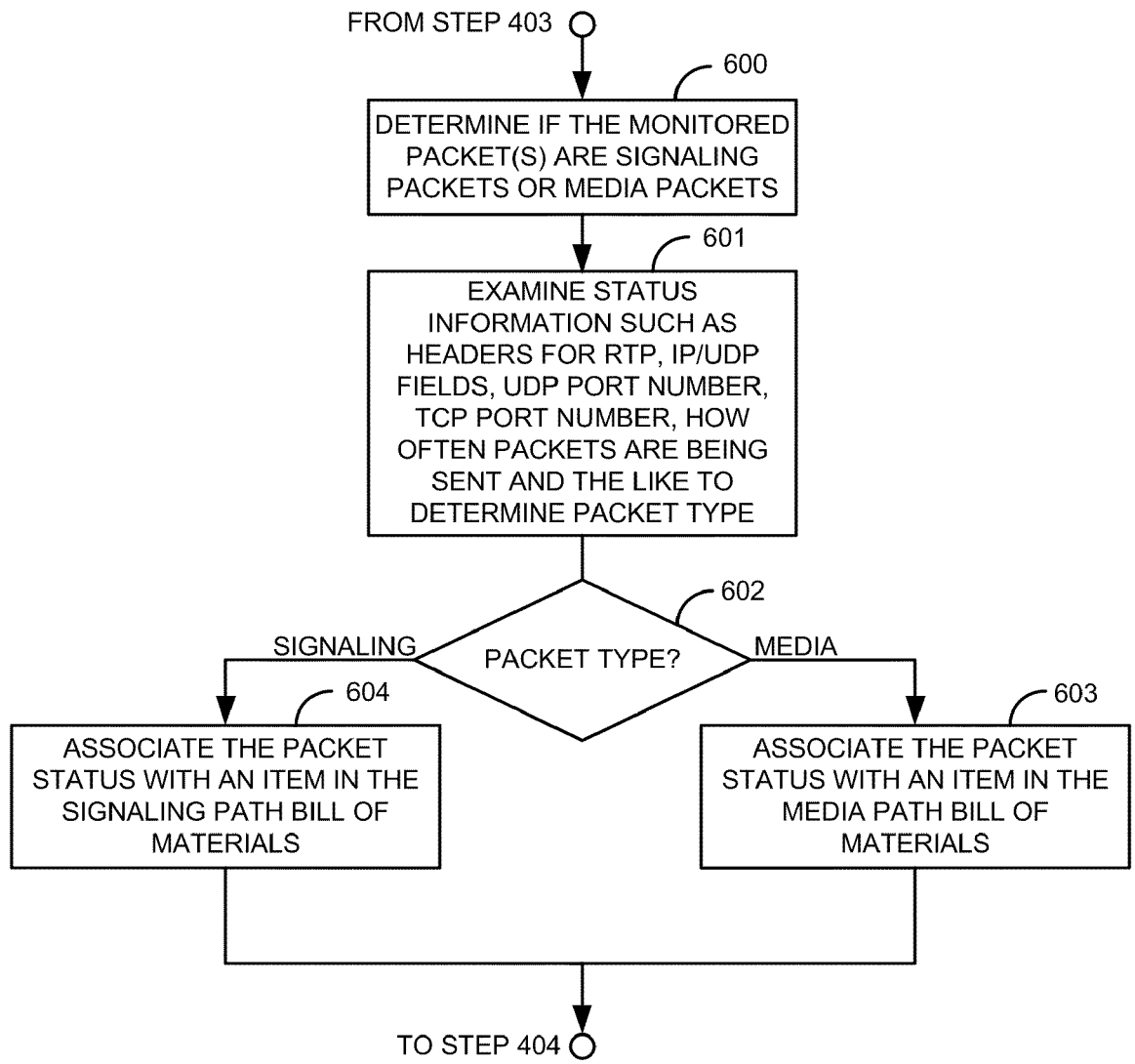
FIG. 6 is a flow diagram of a method for determining if a monitored packet is a signaling packet or a media packet.

FIG. 6 is a flow diagram of a method for determining if a monitored packet is a signaling packet or a media packet. FIG. 6 is shown depicting a step that is done by the network monitor 140. However, some or all of the steps shown in FIG. 6 can be done in a network analyzer 150 before sending a response packet to the network monitor 140. After the network monitor 140 receives 403 a response packet (sent in step 502) that contains a status of the communication, the network monitor 140 determines 600 if the monitored packets are signaling packets or media packets by looking at the status in the response packet.

The network monitor 140 examines 601 the status in the response packet sent in step 502, which can include headers, timestamps, port numbers, the full packet, and the like. For example, the network monitor 140 can look at a packet header to determine if the header is an RTP header (which indicates the packet is a media packet). The network monitor 140 can look at the UDP/TCP port number to determine a packet type. The network monitor 140 can compare a timestamp of a packet and compare it to previous timestamp(s) of a previous packet to determine how often packets are being sent; this may indicate if the packet is a signaling packet (not sent regularly) or a media packet (sent at a periodic rate).

After determining 602 that the packet type is a media packet, the network monitor 140 associates 603 the packet status with an item in the media path bill of materials and the process then goes to step 404. Otherwise, if the packet is a signaling packet in step 602, the network monitor 140 associates 604 the packet status with an item in the signaling path bill of materials; the process then goes to step 404.

Figure 7:
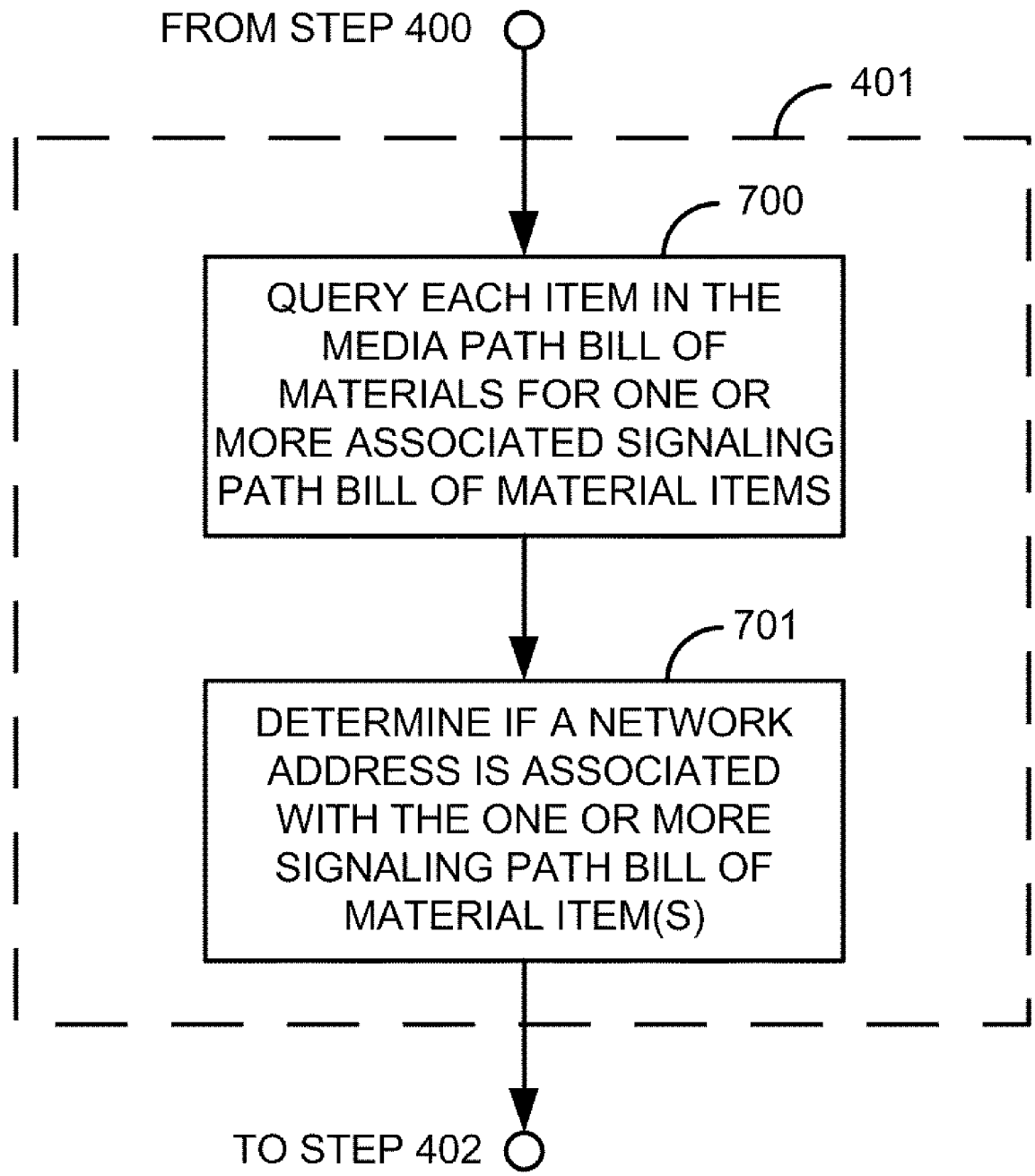
FIG. 7 is a flow diagram of a method for querying each item in the media path bill of materials for an associated signaling path bill of materials.

FIG. 7 is a flow diagram of a method for querying each item in the media path bill of materials for an associated signaling path bill of materials. FIG. 7 depicts an example method of step 401 in FIG. 4. After getting 400 the media path bill of materials, the network controller 140 queries 700 each item in the media path bill of materials for one or more associated signaling path bill of material items. One way to do this with Avaya Communication Manager is to run a query 700 starting with the communication device (e.g. communication device 101A) that originated the communication. The query 700 reveals the next item (e.g. user side signaling hardware 115A) in the bill of materials involved in the communication. The next item in the bill of materials (e.g. 115A) is then queried 700 to get the next item in the bill of materials. This process is repeated until the full bill of materials is derived. This process may vary depending upon the system being used.

Based on the query from step 700, the network monitor 140 determines 701 if a network address is associated with the one or more items in the signaling path bill of materials. A network address may or may not be associated with each item in the media path bill of materials and/or the signaling path bill of materials. For example, a software application/process may not have an associated network address while a hardware device may have an associated network address.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed is:

1. A system for monitoring a communication comprising:
   a. a network monitor configured to get a media path bill of materials for the communication between a plurality of communication devices across a network, get a signaling path bill of materials for the communication between the plurality of communication devices across the network, wherein the media path bill of materials and the signaling path bill of materials each comprise a plurality of items, and wherein the media path bill of materials and the signaling path bill of materials comprise a communication path bill of materials, send at least one configuration packet to a plurality of network analyzers to monitor one or more packets that contain a status of the communication in relation to at least one of the plurality of items in the communication path bill of materials, receive a response packet that contains the status of the communication in relation to the at least one of the plurality of items in the communication path bill of materials, and output the status of the communication in relation to the monitored at least one of the plurality of items in the communication path bill of materials, wherein one or more of the network monitor and at least one of the plurality of network analyzers are further configured to determine if one of the one or more packets is a signaling packet or a media packet, in response to the one of the one or more packets being the signaling packet, associating the status in the signaling packet with an item in the signaling path bill of materials, and in response to the one of the one or more packets being the media packet, associating the status in the media packet with an item in the media path bill of materials.

2. The system of claim 1, wherein one or more of the network monitor and one of the plurality of communication devices are configured get the outputted status of the communication and to display the outputted status of the communication in relation to the monitored at least one of the plurality of items in the communication path bill of materials.

3. The system of claim 1, further comprising the plurality of network analyzers configured to receive the at least one configuration packet, monitor the one or more packets that contain the status of the communication in relation to the plurality of items in the communication path bill of materials, and send the response packet to the network monitor.

4. The system of claim 1, wherein one or more of the network monitor and the plurality of network analyzers are further configured to do at least one of the following: examine a payload in the one of the one or more packets to determine a packet type, determine if the payload in the one of the one or more packets has a Real Time Transport (RTP) header, examine multiple fields in an Internet Protocol (IP)/User Datagram Protocol (UDP) header to determine the packet type, examine how often the one of the one or more packets are being sent to determine the packet type, examine a UDP port number to determine the packet type, and examining at a Transmission Communication Protocol (TCP) port number to determine the packet type.

5. The system of claim 1, wherein the network monitor is further configured to query each item in the media path bill of materials for one or more associated signaling path bill of materials items and determine a network address associated with at least one of the one or more associated signaling path bill of material items.

6. The system of claim 1, wherein the communication path bill of materials comprises at least one hardware device and at least one software element.

7. The system of claim 1, wherein the communication path bill of materials comprises at least one of the following: a hardware device, a virtual device, a software element, a link between items, a packet switching device, and a Time Division Multiplexing (TDM) device.

8. The system of claim 1, wherein the network monitor is further configured to send a separate configuration packet to each of the plurality of network analyzers.

9. The system of claim 1, wherein the communication path bill of materials is displayed based on a network layer.

10. The system of claim 1, wherein a user of one of the plurality of communication devices initiates getting the media path bill of materials for the communication between a plurality of communication devices across a network.

11. The system of claim 1, wherein the status of the communication in relation to the one or more of the plurality of items in the communication path bill of materials is at least one of the following: a noise metric, an echo metric, a suspicious port number, a signal quality, a signal level, a timestamp, a number of lost packets, a number of delayed packets, an Internet Protocol (IP) address, a User Datagram Protocol (UDP) address, a UDP port, a Transmission Control Protocol (TCP) address, a TCP port, and a Media Access Control (MAC) address.

12. The system of claim 1, wherein the communication path bill of materials is displayed in conjunction with a physical map.

13. The system of claim 1, wherein one of the items in the communication path bill of materials is a link between a first and a second item and wherein mousing over a side next to the first item displays a status of the one or more packets going into the first item and mousing over a side next to the second item displays a status of the one or more packets going into the second item.

14. The system of claim 1, wherein one of the items in the communication path bill of materials is a node and wherein mousing over the node displays a status of the node.

15. The system of claim 1, wherein the network monitor is configured to display the status of the communication in relation to the monitored plurality of items in the communication path bill of materials by one of the following: set a color of an individual item in the communication path bill of materials, set a color based on a network level, set a color based on function, set a color based on a type of packet, change the intensity of a color based time, display text for the item in the communication path bill of materials, and change an icon of an item in the communication path bill of materials.

16. A method for monitoring a communication comprising:
   a. getting at a network monitor a media path bill of materials for the communication between a plurality of communication devices across a network;
   b. getting a signaling path bill of materials for the communication between the plurality of communication devices across the network, wherein the media path bill of materials and the signaling path bill of materials each comprise a plurality of items, and wherein the media path bill of materials and the signaling path bill of materials comprise a communication path bill of materials;
   c. sending from the network monitor at least one configuration packet to a plurality of network analyzers to monitor one or more packets that contain a status of the communication in relation to at least one of the plurality of items in the communication path bill of materials;
   d. receiving at the network monitor a response packet that contains the status of the communication in relation to the at least one of the plurality of items in the communication path bill of materials;
   e. outputting from the network monitor the status of the communication in relation to the monitored at least one of the plurality of items in the communication path bill of materials;

f. determining in one or more of the network monitor and at least one of the plurality of network analyzers if one of the one or more packets is a signaling packet or a media packet;

g. responsive to the one of the one or more packets being the signaling packet, associating the status in the signaling packet with an item in the signaling path bill of materials; and h. responsive to the one of the one or more packets being the media packet, associating the status in the media packet with an item in the media path bill of materials.

17. The method of claim 16, further comprising the steps of:

getting the outputted status of the communication and displaying the outputted status of the communication in relation to the monitored at least one of the plurality of items in the communication path bill of materials.

18. The method of claim 16, further comprising the steps of:

i. receiving in the plurality of network analyzers the at least one configuration packet;

j. monitoring in the plurality network analyzers the one or more packets that contain the status of the communication in relation to the plurality of items in the communication path bill of materials; and k. sending the response packet to the network monitor.

19. The method of claim 16, wherein the step of determining if the one of the one or more packets is the signaling packet or the media packet further comprises at least one of the following steps: examining a payload in the one of the one or more packets to determine a packet type, determining if the payload in the one of the one or more packets has a Real Time Transport (RTP) header, examining multiple fields in an Internet Protocol (IP)/User Datagram Protocol (UDP) header to determine the packet type, examine how often the one of the one or more packets are being sent to determine the packet type, examine a UDP port number to determine the packet type, and examining at a Transmission Communication Protocol (TCP) port number to determine the packet type.

20. The method of claim 16, wherein the step of getting the signaling path bill of materials further comprises the steps of:

i. querying each item in the media path bill of materials for one or more associated signaling path bill of materials items; and j. determining a network address associated with the one of the one or more associated signaling path bill of material items.

21. The method of claim 16, wherein the communication bill of materials comprises at least one hardware device and at least one software element.

22. The method of claim 16, wherein the communication path bill of materials comprises at least one of the following: a hardware device, a virtual device, a software element, a link between items, a packet switching device, and a Time Division Multiplexing (TDM) device.

23. The method of claim 16, wherein sending the at least one configuration packet further comprises sending a separate configuration packet to each of the plurality of network analyzers.

24. The method of claim 16, wherein the communication path bill of materials is displayed based on a network layer.

25. The method of claim 16, wherein a user of one of the plurality of communication devices initiates step (a).

26. The method of claim 16, wherein the status of the communication in relation to the one or more of the plurality of items in the communication path bill of materials is at least one of the following: a noise metric, an echo metric, a suspicious port number, a signal quality, a signal level, a timestamp, a number of lost packets, a number of delayed packets, an Internet Protocol (IP) address, a User Datagram Protocol (UDP) address, a UDP port, a Transmission Control Protocol (TCP) address, a TCP port, and a Media Access Control (MAC) address.

27. The method of claim 16, wherein the communication path bill of materials is displayed in conjunction with a physical map.

28. The method of claim 16, wherein one of the items in the communication path bill of materials is a link between a first and a second item and wherein mousing over a side next to the first item displays a status of the one or more packets going into the first item and mousing over a side next to the second item displays a status of the one or more packets going into the second item.

29. The method of claim 16, wherein one of the items in the communication path bill of materials is a node and wherein mousing over the node displays a status of the node.

30. The method of claim 16, wherein displaying the status of the communication in relation to the monitored plurality of items in the communication path bill of materials is accomplished by one of the following:

setting a color of an individual item in the communication path bill of materials, set a color based on a network level, set a color based on function, set a color based on a type of packet, change the intensity of a color based time, displaying text on the item in the communication path bill of materials, and changing an icon of an item in the communication path bill of materials.

31. An apparatus for monitoring a communication comprising:

a. means for getting at a network monitor a media path bill of materials for the communication between a plurality of communication devices across a network;

b. means for getting a signaling path bill of materials for the communication between the plurality of communication devices across the network, wherein the media path bill of materials and the signaling path bill of materials each comprise a plurality of items, and wherein the media path bill of materials and the signaling path bill of materials comprise a communication path bill of materials;

c. means for sending from the network monitor at least one configuration packet to a plurality of network analyzers to monitor one or more packets that contain a status of the communication in relation to at least one of the plurality of items in the communication path bill of materials;

d. means for receiving at the network monitor a response packet that contains the status of the communication in relation to the at least one of the plurality of items in the communication path bill of materials; and e. means for outputting from the network monitor the status of the communication in relation to the monitored at least one of the plurality of items in the communication path bill of materials, wherein one or more of the network monitor and at least one of the plurality of network analyzers are further configured to determine if one of the one or more packets is a signaling packet or a media packet, in response to the one of the one or more packets being the signaling packet, associating the status in the signaling packet with an item in the signaling path bill of materials, and in response to the one of the one or more packets being the media packet, associating the status in the media packet with an item in the media path bill of materials.

* * * * *